United States Patent
Miyoshi et al.

(10) Patent No.: US 6,622,013 B1
(45) Date of Patent: Sep. 16, 2003

(54) RECEPTION APPARATUS AND RECEPTION METHOD

(75) Inventors: Kenichi Miyoshi, Yokohama (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/455,934

(22) Filed: Dec. 7, 1999

(30) Foreign Application Priority Data

Dec. 14, 1998 (JP) .......................................... 10-354896

(51) Int. Cl.⁷ .............................. H04B 1/06; H04B 7/00
(52) U.S. Cl. ..................... 455/277.2; 455/562; 455/273
(58) Field of Search ............................... 455/562, 272, 455/273, 277.1, 277.2, 277.3, 278.1; 343/816, 820, 824

(56) References Cited

U.S. PATENT DOCUMENTS

| | | | |
|---|---|---|---|
| 5,666,123 A | | 9/1997 | Chrystie |
| 5,689,272 A | | 11/1997 | Harrison et al. |
| 5,907,816 A | * | 5/1999 | Newman et al. ......... 455/277.2 |
| 6,321,082 B1 | * | 11/2001 | Katz ......................... 455/422 |
| 6,330,458 B1 | * | 12/2001 | Lamoureux et al. ........ 375/334 |
| 6,347,234 B1 | * | 2/2002 | Scherzer ..................... 455/550 |
| 6,415,163 B1 | * | 7/2002 | Keskitalo et al. ........... 455/562 |
| 6,438,389 B1 | * | 8/2002 | Sandhu et al. .............. 455/562 |

FOREIGN PATENT DOCUMENTS

| | | |
|---|---|---|
| JP | 9-307492 | 11/1997 |
| JP | 10256970 | 9/1998 |

OTHER PUBLICATIONS

English Language Abstract of JP 10–256970.

* cited by examiner

Primary Examiner—Dwayne Bost
Assistant Examiner—James K. Moore
(74) Attorney, Agent, or Firm—Greenblum & Bernstein, P.L.C.

(57) ABSTRACT

Desired signal power detection sections 109 to 116 measure a signal power level from a communication partner received at respective antennas 101 to 108. Antenna set selection section 117 obtains a sum of signal power levels from the communication partner received at four antennas belonging to each of antenna sets A to D each composed of combined antennas selected in advance to form a predetermined radiation pattern, for each antenna set, and selects an antenna set with the sum being the highest. Switch 120 connects received signals only from antennas belonging to the selected antenna set to reception RF sections 121 to 124. Received signal inputted to respective reception RF sections 121 to 124 are converted into respective intermediate-frequency signals, combined in signal combining section 125, and demodulated in demodulation section 126 to be a desired signal.

9 Claims, 10 Drawing Sheets

RECEPTION APPARATUS AND RECEPTION METHOD

BACKGROUND OF THE INVENTION

1. Field of the Invention

The present invention relates to a reception apparatus and reception method, more particularly, a diversity system reception apparatus and reception method which obtain excellent reception conditions using a selected antenna set.

2. Description of the Related Art

FIG. 1 illustrates the whole configuration of a conventional diversity system reception apparatus. The reception apparatus is composed of 8 reception antennas 1 to 8, reception RF sections 9 to 16 of which the number is the same as that of reception antennas, signal combining section 17, and demodulation section 18.

In the reception apparatus with the above-mentioned configuration, received signals received at reception antennas 1 to 8 are inputted to reception RF sections 9 to 16 to output downconverted signals with an intermediate frequency, respectively. The intermediate-frequency signals are subjected to equal-gain combining or maximal-ratio combining in signal combining section 17, and then demodulated in demodulation section 18. The demodulated message is thus finally obtained.

However, in the reception apparatus, since it is necessary to prepare reception RF sections 9 to 16 of which the number is the same as that of reception antennas 1 to 8, there is the problem that the circuit scale for signal processing becomes large. Further, since complicated signal processing such as subjecting each received signal to weighting to combine, in order to obtain diversity effects as much as possible, there is another problem that it takes a relatively long time to process signals.

In order to solve such problems, proposed is a diversity system reception apparatus disclosed in Japanese Unexamined Patent Publication HEI9-307492.

FIG. 2 illustrates a configuration of the above-mentioned reception apparatus. Antennas 21 to 24 each has a radiation pattern, and receives a radio signal with the radiation pattern. Selection section 25 receives a control signal from control section 26 and transmits a received signal for each antenna to comparison section 27 sequentially, while having the function for selecting an antenna for use in reception. Comparison section 27 compares a level of the received signal, and transmits the compared result to control section 26. Based on the compared result, control section 26 transmits the control signal instructing to select an antenna with the largest received level and another antenna with the second largest received level.

Combining section 28 subjects received signals from antennas that selection section 25 selects to phase control and amplitude control, and then combines the resultant signals. Reception section 29 receives a combined received signal to output a desired signal.

Operations in the reception apparatus are next explained. First, received signals received at antennas 21 to 24 are transmitted sequentially to comparison section 27 through selection section 25. Comparison section 27 compares a level of the received signal from each of antennas 21 to 24 to each other, and transmits the compared result to control section 26. Based on the compared result, control section 25 controls selection section 25 to select an antenna with the largest received level and another antenna with the second largest received level. Thus, the received signals from selected antennas are only combined in the combining section after being subjected to the phase control and amplitude control, and then transmitted to the reception section. The optimal reception conditions are thus achieved.

As described above, according to the reception apparatus, since received signals only from two antennas selected from among antennas 21 to 24 are signal-processed, the circuit scale for the signal processing can be reduced.

However, in the reception apparatus disclosed in Japanese Unexamined Patent Publication HEI9-307492, since an antenna is selected based on a received quality obtained with the antenna alone, the combination of antennas which provides the best received quality of a combined signal is not always obtained. Further, in the case where the antenna is selected based on the received quality of the combined signal, since the number of combinations of antennas of which the received quality is compared increases exponentially as the number of antennas is increased to improve the diversity effects, the antenna selection method becomes complicated.

When the antenna selection method thus becomes complicated, since the complicated comparison method and control are necessary, the circuit scale becomes large, causing the problem that it takes a longer time to select antennas. As a result, the conventional problem is not solved.

SUMMARY OF THE INVENTION

An object of the present invention is to provide a reception apparatus and reception method that achieve excellent reception conditions in a short time with a small-scaled calculation circuit using a simple selection method.

The present invention provides the reception apparatus that handles as a unit an antenna set with antennas combined in advance. Specifically, in selecting antennas for use in reception, handling the antenna set as the unit, the reception apparatus collectively selects antennas using as a criterion qualities of received signals received at the antenna set.

Since the apparatus thus handles the antenna set as the unit, it is possible to limit the number of calculation times for received qualities to be needed as the criterion for the antenna selection and the number of combinations of target antennas for the antenna selection, as compared to the case where each antenna is handled as the unit. Accordingly, it is possible to achieve excellent reception conditions in a short time with the small-scaled calculation circuit.

Further, the antenna set according to the present invention is composed of antennas which are selected in advance from among some antenna groups so that the antennas belonging to the antenna set forms a predetermined radiation pattern.

Since the antennas belonging to the antenna set thus form the predetermined radiation pattern, it is possible to achieve the excellent reception conditions assuredly even though a simple selection method handling the antenna set as the unit is used.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Figure 1:
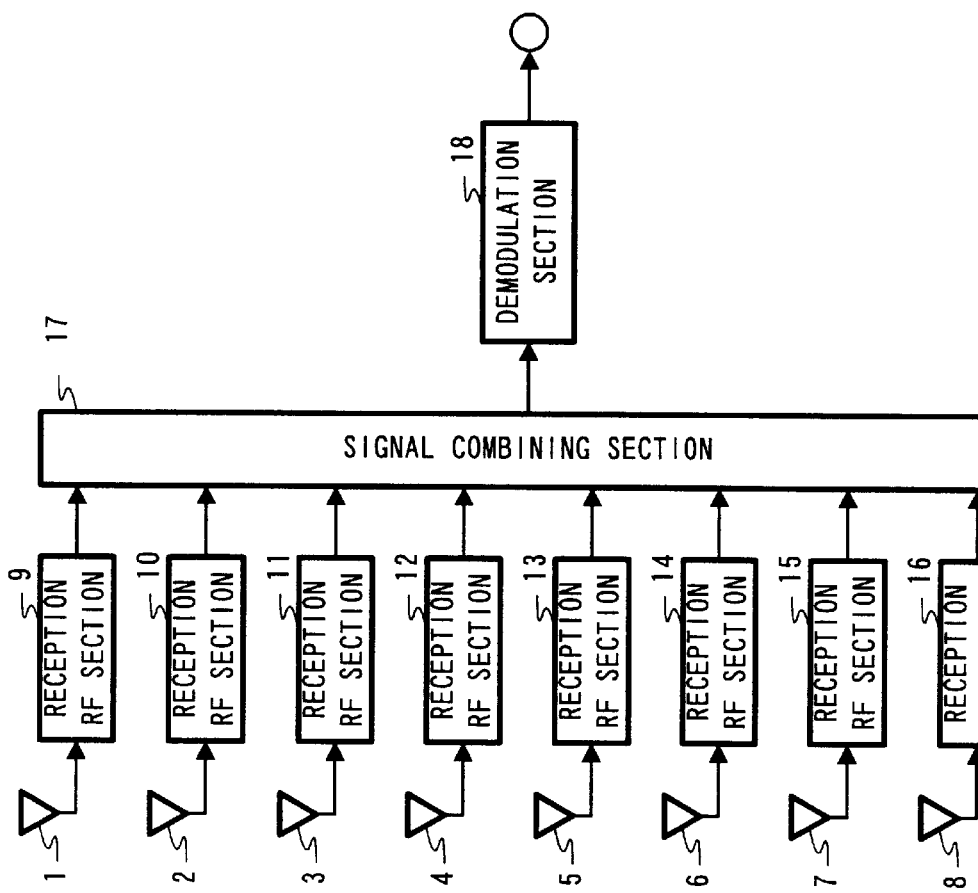
FIG. 1 is a block diagram illustrating a whole configuration of a conventional diversity system reception apparatus.
Figure 2:
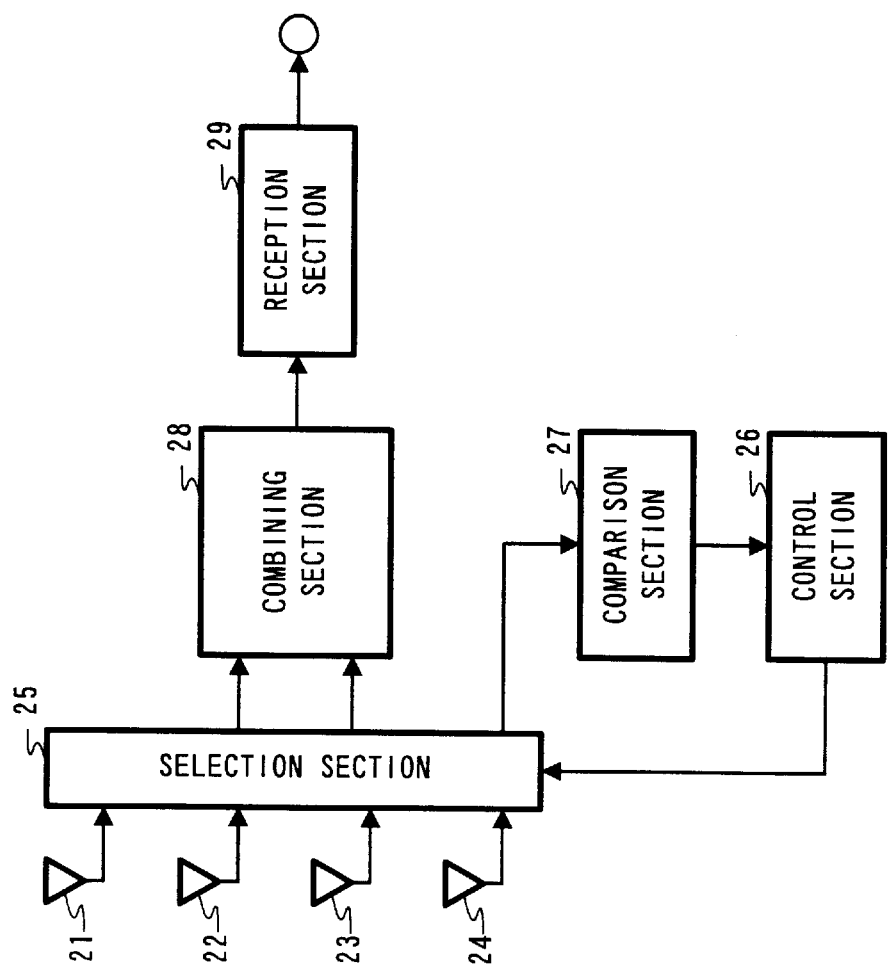
FIG. 2 is a block diagram illustrating a whole configuration of a conventional diversity system reception apparatus.

The reception apparatus according to the present invention has a plurality of antenna sets each of which is composed of directional antennas selected in advance from a plurality of directional antennas to form a predetermined radiation pattern, a quality detector that detects a quality of a received signal received at each of the directional antennas, and an antenna set selector that selects an antenna set for use in reception based on the quality obtained in the quality detector, and performs selection of antennas for use in reception handling the antenna set as a unit. Therefore, in detecting a received quality used as a criterion for antenna selection, it is possible to omit useless processing that detection is repeated at the number of times equal to the number of combinations corresponding to arbitrary combinations of antennas.

In addition, since antennas belonging to the antenna set form a predetermined radiation pattern, it is possible to achieve excellent reception conditions assuredly even when such a simple selection method handling the antenna set as the unit is used. Further, since the antenna set is the combination of in-advance-selected antennas, and the number of antenna sets is small, it is made possible to select the antenna set fast, and it is also possible to achieve excellent reception conditions immediately responding to changes of reception environments.

In addition, it may be possible that the same antenna belongs to different antenna sets, and that the antenna set is composed of only a single antenna. Moreover, it may be possible that the number of antennas belonging to the antenna set varies.

Further, in the reception apparatus of the present invention, the plurality of directional antennas are divided into a plurality of antenna groups each composed of a plurality of directional antennas each with a radiation pattern with a respective different direction, and the directional antennas belonging to the antenna set are selected in advance from among the directional antennas composing the antenna group.

Therefore, since the plurality of directional antennas are divided into a plurality of antenna groups, the installation of antennas are facilitated by installing antennas collectively for each antenna group. Moreover, as antennas belonging to the antenna set, it is satisfactory that a number of antennas to be needed are selected from among antennas composing the antenna group, facilitating the antenna selection. Further, when it is determined that as antennas belonging to the same antenna, two or more antennas are not selected from the same antenna group, the antennas for use in reception are away from each other by a predetermined distance, improving spatial diversity effects.

In addition, for the selection of antennas belonging to the antenna set, it may be possible that two or more antennas are selected from the same group, and that no antenna is selected from some antenna group or groups.

Further, in the reception apparatus of the present invention, the plurality of directional antennas are divided into the plurality of antenna groups each of which is composed of the plurality of directional antennas each with the radiation pattern with the respective different direction, each of the antenna groups is installed near each vertex of a substantially polygon on a virtual plane on which the directional antennas are arranged, and as the directional antennas belonging to the antenna set, a predetermined number of the directional antennas are selected in advance in ascending order of an angle between a direction of a radiation pattern of an directional antenna and another direction that is vertical to one side of the substantially polygon.

Therefore, since the plurality of directional antennas are divided into the plurality of antenna groups, the installation of antennas is facilitated by installing antennas collectively for each antenna group. Further, since it is possible to match directions of radiation patterns of antennas belonging to the antenna set for each antenna set, it is possible to form a predetermined radiation pattern easily.

Further, the reception apparatus of the present invention has reception sections of which the number is smaller than the total number of the plurality of directional antennas, and as the directional antennas belonging to the antenna set, a predetermined number of antennas are selected, where the predetermined number is equal to or less than the number of reception sections.

Therefore, since the number of reception sections is smaller than the total number of antennas, the circuit scale becomes small because of no unnecessary reception sections. Further, since the number of antennas belonging to each antenna set is smaller than the number of reception sections, it is possible to assuredly receive signals from concurrently used antennas.

Furthermore, in the reception apparatus of the present invention, the quality detector detects a quality of each received signal received at respective directional antenna, where the received signal is not combined yet, and the antenna set selector selects the antenna set for use in reception under a condition that the antenna set contains at least an directional antenna with the quality being the highest, or that the antenna set has the total quality being highest, where the total quality is obtained by totaling each quality of each of the directional antennas contained in the antenna set.

Therefore, it is possible to select antennas by detecting the quality of each received signal that is not combined yet, it is possible to perform the selection of the antenna set easily and fast without executing signal combining processing and demodulation processing.

Further, with respect to the condition that the antenna set contains the directional antenna from which the received signal has the highest quality, and the condition that the total quality obtained from qualities of received signals from the directional antennas contained in the antenna set is the highest, each condition has the strong correlation with qualities of a combined received signal, and is a criterion of which the calculation can be processed relatively easily. Therefore, the method is not only simple, but also capable of achieving diversity effects.

Furthermore, in the reception apparatus of the present invention, the quality detector detects a quality of a combined signal which is obtained by combining the received signals, and the antenna set selector switches the antenna set to another set when the quality does not meet a predetermined criterion, while selecting the antenna set used in a current communication as an antenna set for use in reception when the quality meets the predetermined criterion.

Therefore, since antennas can be selected by quantifying a received quality based on a combined received signal which is a final output in the reception apparatus, it is possible to optimize the received quality the most directly and assuredly.

Further, since the method is simple that the antenna set is switched to another one when the received quality does not meet the predetermined criterion, it is possible to achieve diversity effects easily with the small-sized circuit scale maintained.

Furthermore, in the reception apparatus of the present invention, the quality is at least one selected from the group consisting of a received field strength, a received power level, a field strength of a received signal from a communication partner, a power level of the received signal from the communication partner, a ratio of the field strength of the received signal from the communication partner to a total received field strength, and a ratio of the power level of the received signal from the communication partner to a total received power level.

Therefore, since the selection of antenna set is performed based on the criterion having the strong correlation with the qualities of the combined received signal, it is possible to optimize the received quality assuredly.

Further, in the reception apparatus of the present invention, the quality is at least one selected from the group consisting of a presence or absence of error detection, a detected result obtained using a cyclic redundant code, an error rate and a constellation variance.

Therefore, since the selection of the antenna set is performed based on the criterion directly indicating qualities of a demodulated received signal, it is possible to optimize the received quality assuredly the most directly.

In the reception apparatus of the present invention, the antenna set selector has a preliminary selector that selects the antenna set based on the quality of a frame of the received signal, a selected information storage that stores the selected antenna set, and a combining demodulator that combines received signals from the directional antennas belonging to the antenna set stored in the selected information storage section to demodulate in receiving a next frame after the frame.

Therefore, since the antenna set is selected in advance, it is possible to process the combining and demodulation immediately after receiving a received signal from the antennas belonging to the selected antenna set. Accordingly, it is possible to shorten the time required by the demodulation after reception.

In addition, although the reception environments when the antenna set is selected is not the same as those when received signals from the antenna set are combined and demodulated, the variations of reception environments can be neglected by making the time required by the processing for the selection, combining and then demodulation adequately short.

Further, the transmission/reception apparatus of the present invention has the above-mentioned reception apparatus and a transmitter that performs a radio communication using the antenna set selected in the antenna set selector.

Therefore, since the radio transmission is performed using the same antenna set selected in advance to form the radiation pattern, the radiation pattern of the antennas set points to the direction of the communication partner, making it possible to reduce interference in other receivers which are not in the communication partner.

Further, a base station apparatus of the present invention has the above-mentioned reception apparatus. Therefore, the reception apparatus in the base station apparatus can achieve excellent reception conditions in a short time with the small-scaled calculation circuit. Further, the reception apparatus in the base station apparatus can achieve excellent reception conditions also immediately responding to changes of reception environments.

Further, the reception method of the present invention comprises the antenna selection step of selecting a plurality of directional antennas so that the antennas compose an antenna set with a predetermined radiation pattern, the quality detection step of detecting a quality of a received signal received at each of the directional antennas, and the antenna set selection step of selecting the antenna set for use in reception based on the quality obtained in the quality detection step.

According to the method, since the selection of antennas is performed using the antenna set as the unit, it is possible to limit the number of calculation times for received qualities needed as the criterion for the antenna selection and the number of combinations of target antennas for the antenna selection, as compared to the case where each antenna is used as the unit. Accordingly, it is possible to achieve excellent reception conditions in a short time with a small-scaled calculation circuit.

In addition, since antennas belonging to the antenna set form a predetermined radiation pattern, it is possible to achieve excellent reception conditions assuredly even when such a simple selection method handling the antenna set as the unit is used. Further, since the antenna set is the combination of in-advance-selected antennas, and the number of antenna sets is small, it is made possible to select the antenna set fast, and it is also possible to achieve excellent reception conditions immediately responding to changes of reception environments.

Furthermore, in the reception method of the present invention, in the antenna selection step, an directional antenna is selected from an antenna group obtained by dividing the plurality of directional antennas into a plurality of antenna groups each to form radiation patterns with respective different directions.

According to the method, since the plurality of directional antennas are divided into the plurality of antenna groups, the installation of antennas are facilitated by installing antennas collectively for each antenna group.

Moreover, as antennas belonging to the antenna set, it is satisfactory that a number of antennas to be need are selected from among antennas composing the antenna group, facilitating the antenna selection. Further, when it is determined that as antennas belonging to the same antenna, two or more antennas are not selected from the same antenna group, the antennas for use in reception are away from each other by a predetermined distance, improving spatial diversity effects.

Further, the reception method of the present invention comprises the installing step of installing one of the plurality of antenna groups each obtained by dividing the plurality of directional antennas to form radiation patterns with respective different direction near each vertex of a substantially polygon on a virtual plane, and in the antenna selection step, a predetermined number of directional antennas are selected in ascending order of an angle between a direction of a radiation pattern of an directional antenna and another direction that is vertical to one side of the substantially polygon.

According to the method, since the plurality of directional antennas are divided into the plurality of antenna groups, the installation of antennas is facilitated by installing antennas collectively for each antenna group. Further, since it is possible to match directions of radiation patterns of antennas belonging to the antenna set for each antenna set, it is possible to form a predetermined radiation pattern easily.

Further, in the reception method of the present invention, in the quality detection step, the quality of each received signal received at respective directional antenna is detected before the received signal is combined, and in the antenna set selection step, the antenna set for use in reception is selected under a condition that the antenna set contains at least an directional antenna with the quality of the highest value, or that the antenna set has the total quality being highest, where the total quality is obtained by totaling each quality of each of the directional antennas contained in the antenna set.

According to the method, it is possible to select antennas by detecting a quality of each received signal before the received signal is combined, it is possible to perform the selection of the antenna set easily and fast without executing signal combining processing and demodulation processing.

Further, with respect to the condition that the antenna set contains the directional antenna from which the received signal has the highest quality, and the condition that the total quality obtained from qualities of received signals from the directional antennas contained in the antenna set is the highest, each condition has the strong correlation with qualities of a combined received signal, and is a criterion of which the calculation can be processed relatively easily. Therefore, the method is not only simple, but also capable of achieving diversity effects.

In the reception method of the present invention, in the quality detection step, a quality of a combined received signal is detected after the received signal is combined, and in the antenna set selection step, the antenna set is switched to another set when the quality does not meet the predetermined criterion, and the antenna set used in a current communication is selected as an antenna set for use in reception when the quality meets the predetermined criterion.

According to the method, since antennas can be selected by quantifying a received quality based on the combined received signal which is a final output in the reception apparatus, it is possible to optimize the received quality the most directly and assuredly.

Further, since the method is simple that the antenna set is switched to another one when the received quality does not meet the predetermined criterion, it is possible to achieve diversity effects easily with the small-sized circuit scale maintained.

Embodiments of the present invention are explained specifically below with reference to accompanying drawings.

First Embodiment

Figure 3:
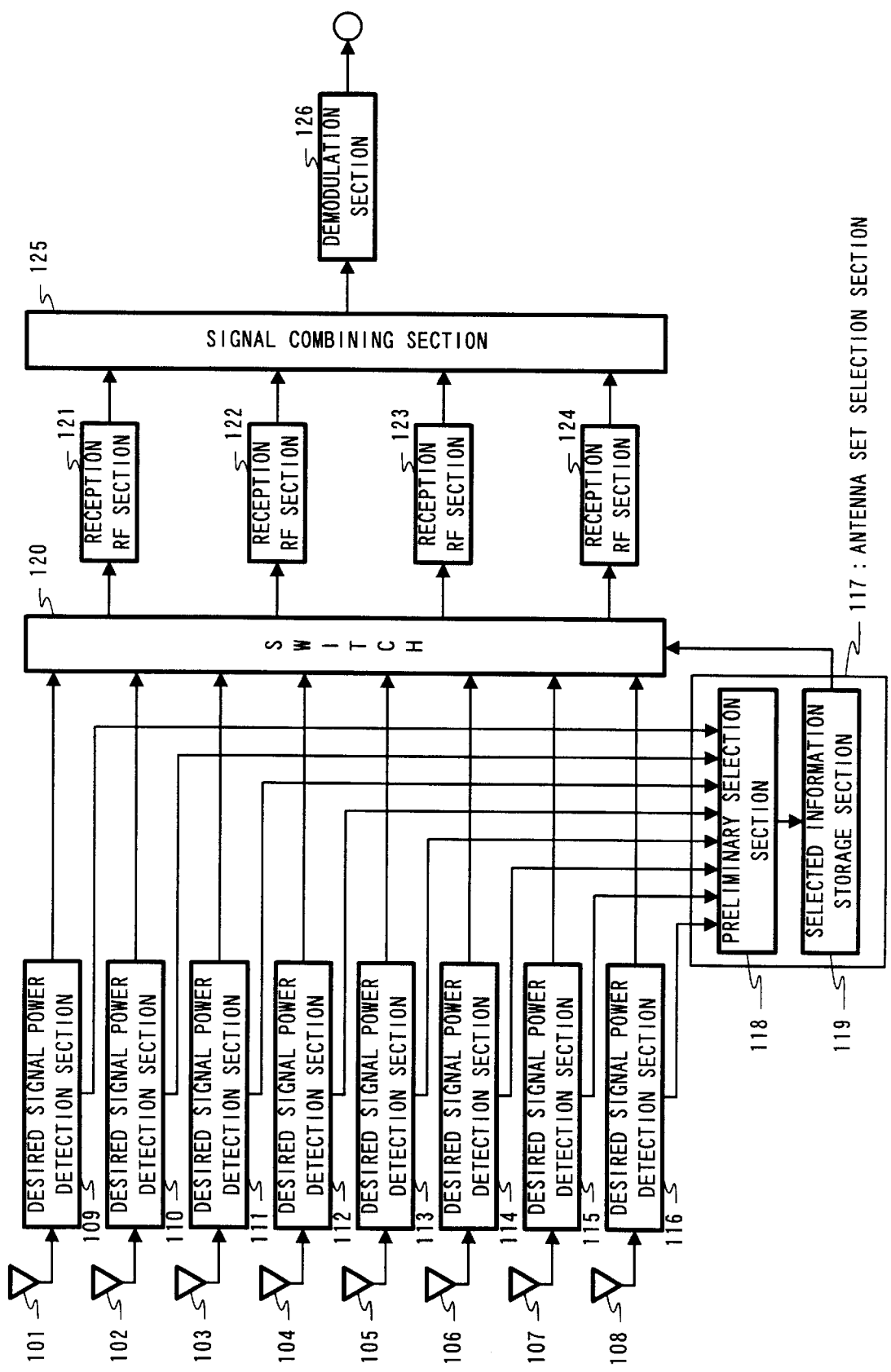
FIG. 3 is a block diagram illustrating a whole configuration of a reception apparatus according to a first embodiment of the present invention.
Figure 4:
FIG. 4 is a diagram illustrating a direction of a radiation pattern of an antenna according to the first embodiment.
Figure 5:
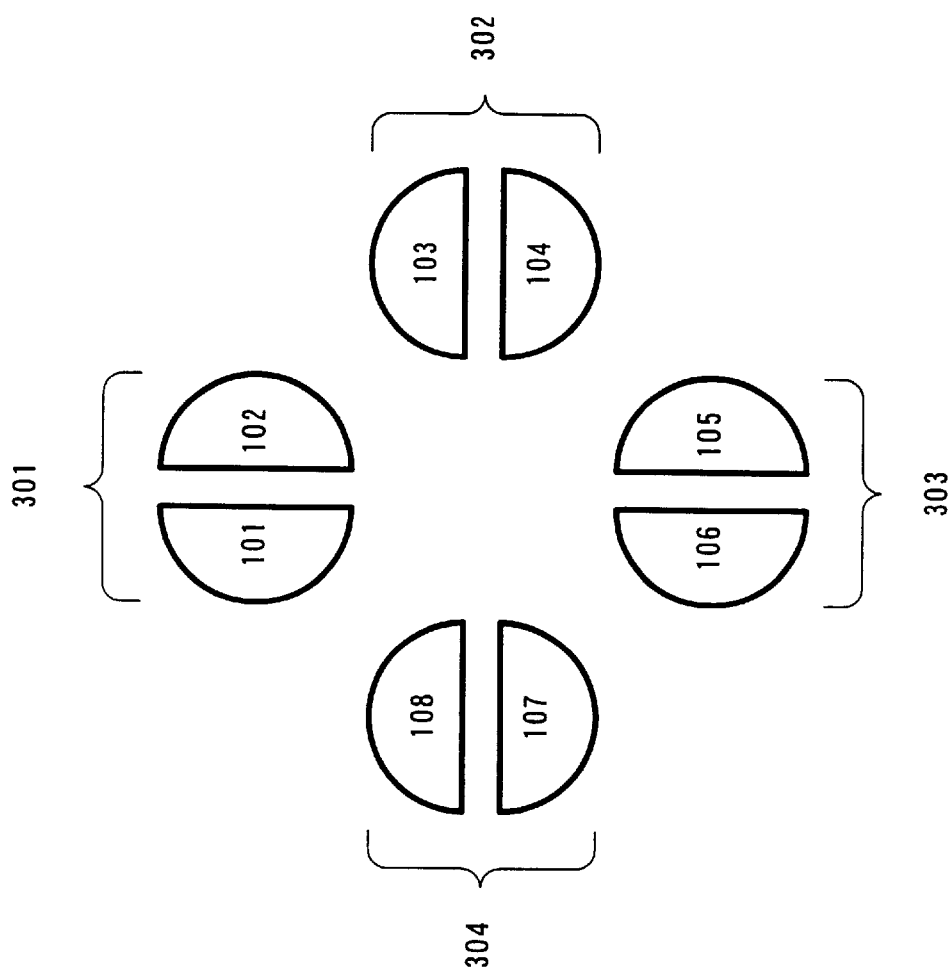
FIG. 5 is a diagram illustrating an arrangement of antennas according to the first embodiment.
Figure 6:
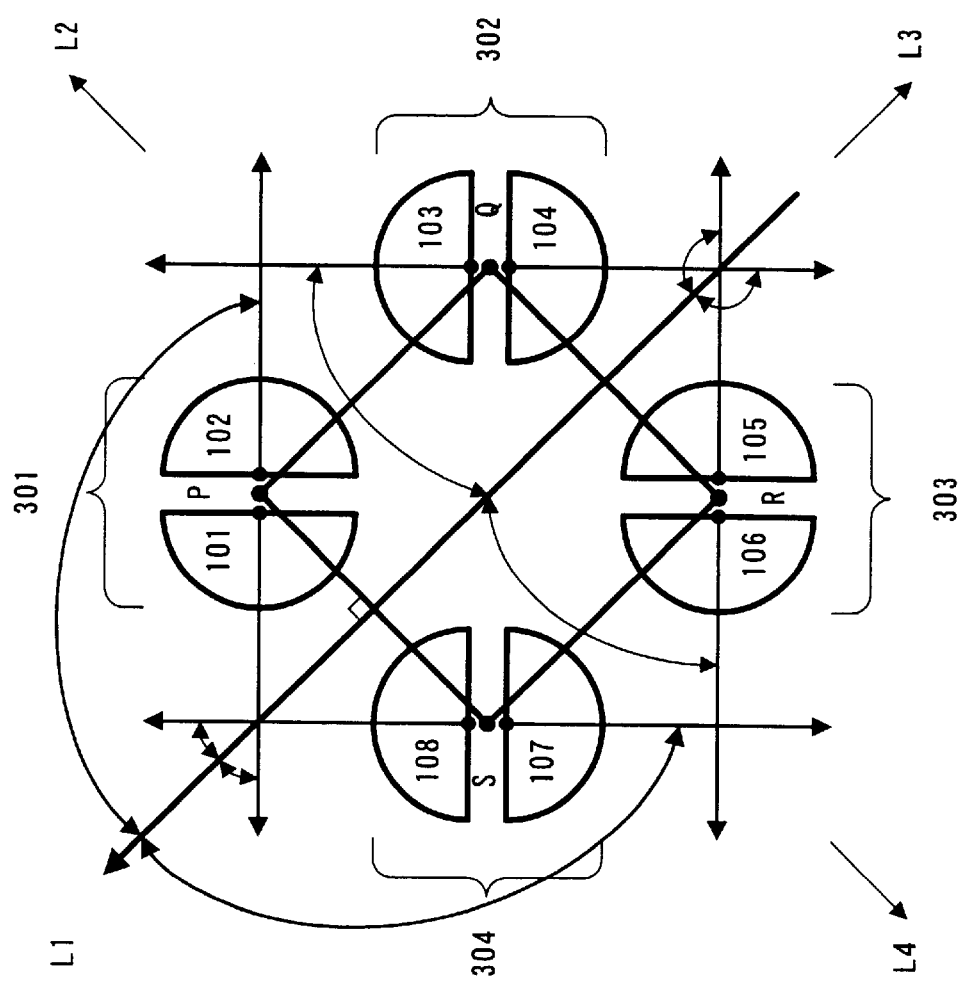
FIG. 6 is a diagram illustrating a method for composing an antenna set according to the first embodiment.

FIG. 3 is a diagram illustrating the whole configuration of a reception apparatus according to the first embodiment of the present invention, FIG. 4 is a diagram illustrating a direction of a radiation pattern of an antenna, FIG. 5 is a diagram illustrating an arrangement of antennas, and FIG. 6 is a diagram to explain a method for composing an antenna set. In addition, the antenna set in the specification of the present invention refers to a set of antennas selected in advance so as to form a predetermined radiation pattern, of which the details are described later.

The whole configuration of the reception apparatus according to the first embodiment of the present invention is first explained using FIG. 3. Antennas 101 to 108 each receives a radio signal. Desired signal power detection sections 109 to 116 each fetches a signal from a communication partner from the received signal to measure a power level of the signal, and outputs the measured level to antenna set selection section 117.

Antenna set selection section 117 are composed of preliminary selection section 118 and selected information storage section 119, and preliminary selection section 118 selects the antenna set for use in reception based on outputs from desired power detection sections 109 to 116. Selected information storage section 119 temporarily stores the antenna set selected in preliminary selection section 118, and transmits at a predetermined timing a control signal instructing to switch between input terminals of switch 120 to switch 120.

Switch 120 switches between input terminals thereof to output received signals only from antennas belonging to the antenna set stored in selected information storage section 119 to reception RF sections 121 to 124. Reception RF sections 121 to 124 each converts the inputted received signal into an intermediate-frequency signal to output to signal combining section 125. Signal combining section 125 combines four intermediate-frequency signals respectively outputted from reception RF sections 121 to 124. Demodulation section 126 demodulates an output signal from signal combining section 125 to output a desired signal.

The composition of an antenna and that of the antenna set are next explained specifically using FIG. 4 to FIG. 6. Each antenna with a radiation pattern is indicated as illustrated in FIG. 6, and it is assumed that the direction of the radiation pattern points to a direction of an arrow illustrated in FIG. 4. Using these indications, the arrangement of antennas 101 to 108 is illustrated in FIG. 5.

Antennas 101 and 102 have radiation patterns with reverse directions to each other, and these two antennas compose antenna group 301. The antenna group is a set of some antennas arranged relatively close and is handled as a one body in the structure. To facilitate the handling and installation of the antenna group, for example, antennas 101 and 102 belonging to the same antenna group 301 are collectively fixed to a pole brace installed at a corner on a roof of a building.

In the same way, antennas 103 and 104 compose antenna group 302, antennas 105 and 106 compose antenna group 303, and antennas 107 and 108 compose antenna group 304. These antennas 103 to 108 are also handled as the one body in the structure for each antenna group.

On the other hand, with respect to the relationship between mutual positions of antenna groups 301 to 304, each group is arranged away from another one by a distance which is about ten times the wavelength of the received signal to obtain effects by spatial diversity. In this embodiment of the present invention, it is assumed that each of antenna groups 301 to 304 is installed at one of four corners on the roof of the building respectively.

The next description explains about the method for selecting antennas belonging to each of antenna sets A to D from among antennas 101 to 108 using FIG. 6. Antenna groups 301 to 304 are respectively arranged at four corners P, Q, R and S on the roof of the building, and a quadrangle PQRS is defined on a virtual plane. Using as a criterion an arrow L1 indicating a direction vertical to one side PS of the tetragon PQRS, antennas belonging to an antenna set are selected with the method described below.

For example, antennas 101 to 108 each has a radiation pattern, and in ascending order of an angle between the direction of the radiation pattern thereof and the direction of the arrow L1, four antennas are selected. According to FIG. 6, antennas 101, 103, 106 and 108 are selected each with the angle between the direction of the radiation pattern thereof and the direction of the arrow L1 being about 45 degrees. The antenna set composed of antennas thus selected and combined is referred to as antenna set A.

In the same method, with respect to each side PQ, QR or RS of the tetragon PQRS, antennas belonging to each of the antenna sets B, C and D are selected, respectively. The results obtained by performing the selection actually are shown in. The antenna set A has a radiation pattern pointing to a direction of L1, the antenna set B has a radiation pattern pointing to a direction of L2, the antenna set C has a radiation pattern pointing to a direction of L3, and the antenna set D has a radiation pattern pointing to a direction of L4.

received signal received at each of antennas 101 to 108, respectively. The measured results are shown in Table 2.

TABLE 2

| Antenna number | 101 | 102 | 103 | 104 | 105 | 106 | 107 | 108 |
|---|---|---|---|---|---|---|---|---|
| Desired signal power level | 40 | 60 | 20 | 10 | 5 | 55 | 5 | 10 |

Antenna set selection section 117 selects an antenna set for use in reception based on the measured results. Specifically, as illustrated in Table 3, antenna set selection section 117 obtains a sum of desired signal power levels received at four antennas belonging to each antenna set A, B, C or D, and selects the antenna set with the largest sum as the antenna set for use in reception.

TABLE 3

| Antenna set | Antennas belonging to antenna set | Sum of desired signal power level | Antenna set for use in reception |
|---|---|---|---|
| A | 101, 103 106, 108 | 125 | ○ |
| B | 102, 103 105, 108 | 95 | |
| C | 102, 104 105, 107 | 80 | |
| D | 101, 104 106, 107 | 110 | |

TABLE 1

| | Antennas belonging to antenna set: indicated by o | | | | | | | | |
|---|---|---|---|---|---|---|---|---|---|
| | Antenna group 301 | | Antenna group 302 | | Antenna group 303 | | Antenna group 304 | | |
| Antenna set | A* 101 | A* 102 | A* 103 | A* 104 | A* 105 | A* 106 | A* 107 | A* 108 | Radiation Pattern |
| A | ○ | | ○ | | | ○ | | ○ | L1 |
| B | | ○ | ○ | | ○ | | | ○ | L2 |
| C | | ○ | | ○ | ○ | | ○ | | L3 |
| D | ○ | | | ○ | | ○ | ○ | | L4 |

A* denotes antenna.

When antennas belonging to each of the antenna sets A, B, C and D are selected with the above-mentioned method, since the directions of radiation patterns of antennas belonging to each set are matched for each antenna set, each antenna set forms a predetermined radiation pattern. Further, four radiation patterns are formed each pointing to a direction corresponding to one of sides of the tetragon PQRS, the directions of radiation patterns cover almost all directions. Accordingly, by selecting the antenna set for use in reception from among only four antenna sets each with the predetermined radiation pattern, it is possible to obtain high diversity effects for received signals from all directions.

Operations in the reception apparatus according to the first embodiment of the present invention are next explained using FIG. 3 previously described. In FIG. 3, when antennas 101 to 108 each receives a radio signal, desired signal power detection sections 109 to 116 each measures a power level of a signal from a communication partner (hereinafter, referred to as desired signal power level) contained in the Since the selection of antennas for use in reception is thus performed handing the antenna set with antennas combined in advance to form a radiation pattern as a unit, it is possible to omit the uselessness that the sum of desired signal power levels is calculated repeatedly corresponding to arbitrary combinations of antennas at the same number of times as that of the combinations for the antenna selection. Accordingly, it is possible to achieve excellent reception conditions in a short time with a small-scaled calculation circuit.

In addition, the reason for setting the desired signal power level at a selection criterion is that the desired signal power level has the strong correlation with whether or not qualities of a combined received signal are good. Further, since the desired signal power level is one of qualities which can be detected before the received signals are combined, there are also advantages that the selection of the antenna set can be performed easily and fast without executing signal combining processing and demodulation processing.

By the same reasons, instead of the desired signal power level, it may be possible to employ as the selection criterion a received field strength, received power level, a field strength of a received signal from a communication partner, a ratio of a field strength of a received signal from a communication partner to the total received field strength, or a ratio of a power level of a received signal from a communication partner to the total received power level, or any combinations of thereof in.

After the selection of the antenna set as described above, antenna set selection section 117 controls switch 120 to switch between input terminals thereof so that received signals only from total four antennas belonging to the antenna set A, i.e., antennas 101, 103, 106 and 108, are connected respectively to four reception RF sections 121 to 124.

Thus, among received signals received at eight antennas 101 to 108, only half of the received signals are needed to connect to reception RF sections 121 to 124. Therefore, it is possible to reduce the number of reception RF sections each of which has a large circuit scale particularly in the reception apparatus. As a result, it is possible to reduce the circuit scale in the whole reception apparatus.

It is thus possible to achieve excellent reception conditions with diversity effects obtained even when received signals only from total four antennas belonging to the antenna set A, i.e., antennas 101, 103, 106 and 108, are connected respectively to four reception RF sections 121 to 124, combined and demodulated. It is obvious from that in a general diversity system with the combining of received signals such as maximal-ratio combining, it is possible to prevent signal qualities of combined signals from deteriorating without using received signals with poor received qualities in the signal combining.

Finally, received signals inputted to reception RF sections 121 to 124 are respectively converted into the intermediate-frequency signals, combined in signal combining section 125, and demodulated in demodulation section 126 to be a desired signal.

Figure 7:
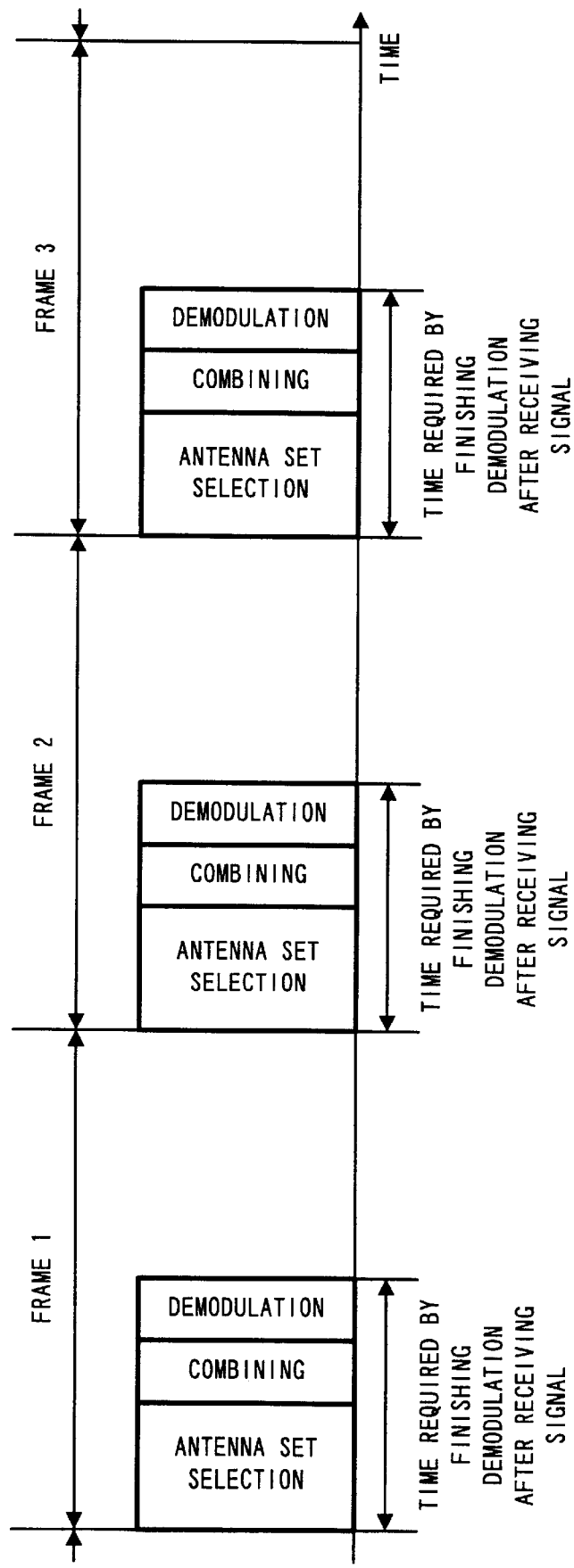
FIG. 7 is a timing diagram illustrating timings used for selecting the antenna set according to the first embodiment.
Figure 8:
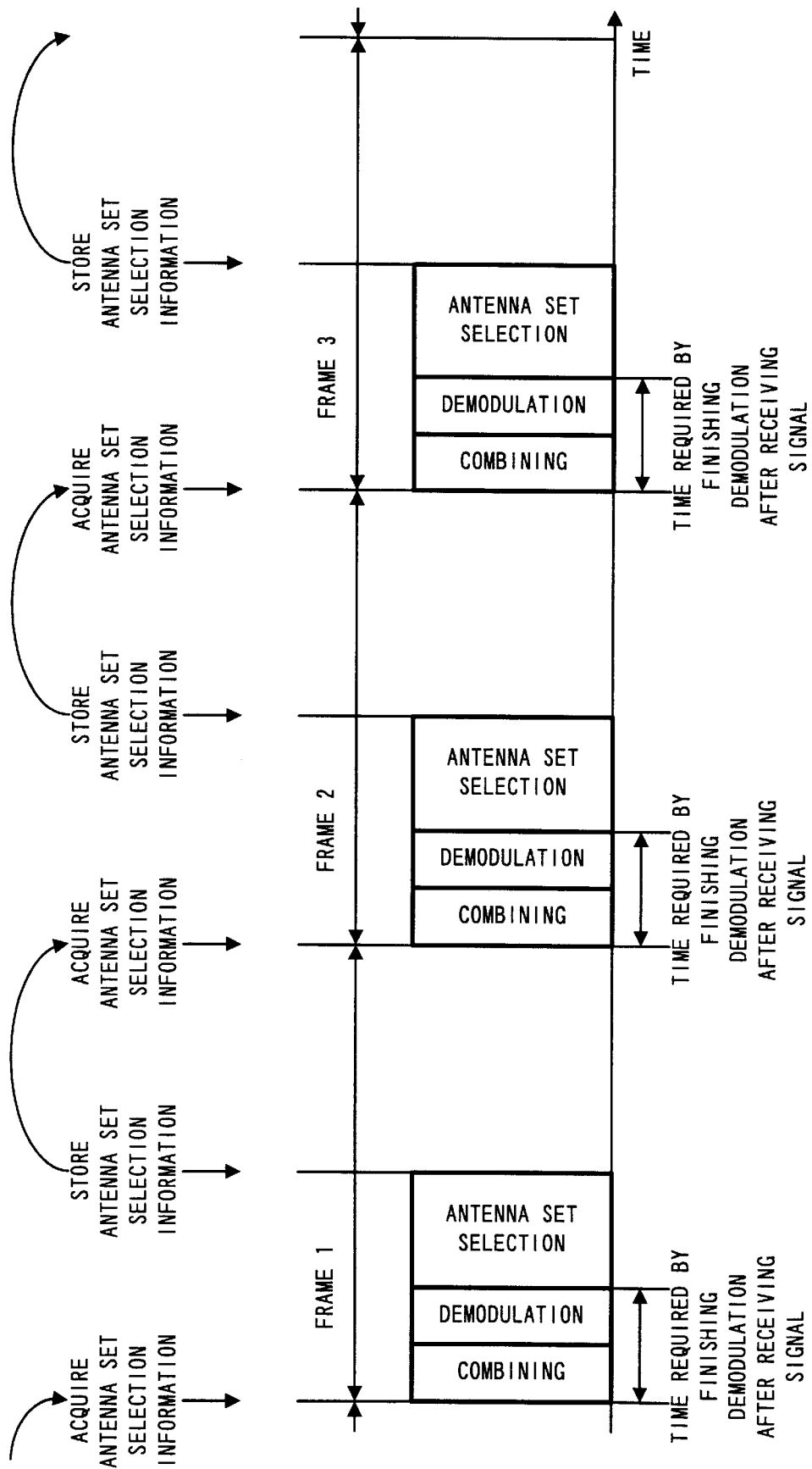
FIG. 8 is a timing diagram illustrating timings used for selecting the antenna set according to the first embodiment.

The above-mentioned explanations explain about the case where the combining and demodulation of received signals are executed after the selection of the antenna set. To execute the series of processing including the above-mentioned case, two methods are considered in view of timing for the selection of the antenna set. Such methods are explained below specifically using FIG. 7 and FIG. 8. FIG. 7 and FIG. 8 are both timing diagrams illustrating timings for selecting the antenna set, and indicates respectively the first method and the second method.

The first method is first explained using FIG. 7. In this method, at the same time as receiving a head of a frame of a received signal, preliminary selection section 118 in antenna set selection section 117 starts the selection of the antenna set and finishes the selection in a predetermined time. Next, selected information storage section 119 stores the selected antenna set, and immediately transmits the control signal to switch 120. Thereafter, the combining and demodulation of received signals are executed.

According to the first method, although it takes a relatively long time to finish the demodulation of the signal after the signal is received, since qualities related to the frame of the received signal are reflected in the combining and demodulation of received signals with the frame, high diversity effects are obtained even when reception environments vary in a short period. Further, since it is not necessary for selected information storage section 119 to always storage the selected antenna set, it is possible to provide a reception apparatus having a simple configuration with selected information storage section 119 eliminated from antenna set selection section 117.

The second method is next explained using FIG. 8. In this method, at the same time as receiving a head of frame 1 of a received signal, a control signal is transmitted to switch 120 according to the stored information in selected information storage section 119, and immediately the combining and demodulation of the received signals are executed. Next, based on the received quality of frame 1 of the received signal, preliminary selection section 118 in antenna set selection section 117 selects the antenna set, and selected information storage section 119 stores the selected antenna set.

When frame 2 is received thereafter, at the same time as receiving a head of frame 2, selected information storage section 119 transmits to switch 120 the control signal instructing to combine and demodulate received signals from antennas belonging to the antenna set selected based on the received quality of frame 1. The same processing is repeated on following frames.

According to the second method, the antenna selection does not require a time, it is possible to shorten the time required by finishing the demodulation of the signal after the signal is received. In addition, although the quality of the frame of the received signal is reflected in the combining and demodulation of the received signal with not the frame but a next frame after the frame, sufficient diversity effects can be obtained in the case where reception environments do not vary in a short period.

Thus, according to the reception apparatus according to the first embodiment of the present invention, since antennas belonging to the antenna set are first selected based on the directions of radiation patterns of the antennas, it is possible to assuredly compose the antenna set and form the predetermined radiation patterns, with the simple method. In addition, since the selection of antennas for use in reception is performed handling such an antenna set as a unit, it is possible to eliminate the uselessness that processing such as detection, calculation and comparison is repeated corresponding to arbitrary combinations of antennas at the same number of times as that of the combinations in detecting received qualities used as the criterion for the antenna selection.

Further, since received signals from selected antennas are only inputted to reception RF sections, it is possible to decrease a circuit scale with unnecessary reception RF sections eliminated.

In addition, when a transmission/reception apparatus is used which is capable of performing radio transmissions with the antenna set selected in, the reception apparatus according to the first embodiment of the present invention, since the radiation pattern of the antenna set points to the direction of a communication partner, it is possible to perform efficient transmission, and further to reduce interference in other receivers which are not in the communication partner. Such a transmission/reception apparatus is applicable to a base station apparatus in mobile communications.

Second Embodiment

Figure 9:
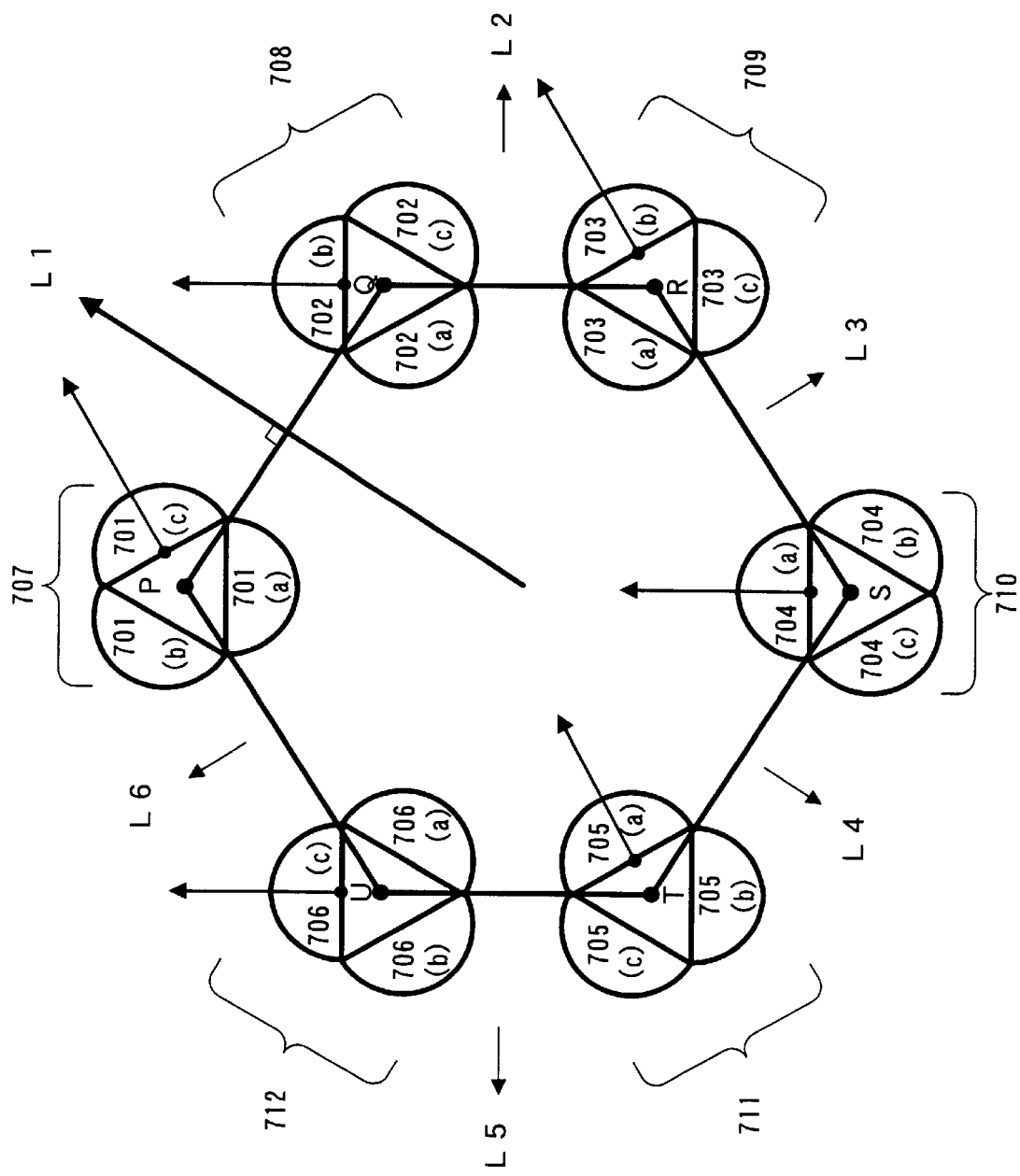
FIG. 9 is a diagram illustrating a method for composing a antenna set in a reception apparatus according to a second embodiment.

FIG. 9 is an explanatory diagram illustrating a method for composing an antenna set in a reception apparatus according to the second embodiment of the present invention. The reception apparatus according to the second embodiment of the present invention has the same configuration as that in the first embodiment except the composition of antennas.

Therefore, the whole configuration of the reception apparatus and operations therein are not explained, and the composition of antennas is only explained below.

Antennas 701(*a*) to 706(*C*) are arranged as illustrated in FIG. 9. Antennas 701(*a*), 701(*b*) and 701(*c*) each has a radiation pattern with a direction that is away by 120 degrees from each other, and these three antennas compose antenna group 707. To facilitate the handling and installation of the antenna group, for example, antennas 701(*a*), 701(*b*) and 701(*c*) are fixed relatively close to each other at a corner on a roof of a building.

In the same way, antennas 702(*a*), 702(*b*) and 702(*c*) compose antenna group 708, and other antennas also compose, as illustrated in FIG. 9, antenna groups 709, 710, 711 and 712.

On the other hand, with respect to the relationship between mutual positions of antenna groups 707 to 712, each group is arranged away from another one by a distance which is about ten times the wavelength of the received signal to obtain effects by spatial diversity.

The next description explains the method for selecting antennas belonging to each of antenna sets A to F from among antennas 701(*a*) to 706(*c*) using FIG. 9. Antenna groups 701 to 712 are respectively arranged at P, Q, R, S, T and U, and a hexagon PQRSTU is defined on a virtual plane. Using as a criterion an arrow L1 indicating a direction vertical to one side PQ of the hexagon PQRSTU, antennas belonging to an antenna set are selected with the method described below.

For example, antennas 701(*a*) to 706(*c*) each has a radiation pattern, and each belongs to one of antenna groups 707 to 712. Selected from each antenna group is an antenna in which the angle between the direction of the radiation pattern thereof and the direction of the arrow L1 is the smallest.

According to FIG. 9, selected from antenna group 707 is antenna 701(*c*) in which the angle between the direction of the radiation pattern thereof and the direction of the arrow L1 is about 30 degree. In the same way, antennas 702(*b*), 703(*b*), 704(*a*), 705(*a*) and 706(*c*) are selected from respective antenna groups. The antenna set composed of antennas thus selected and combined is referred to as antenna set A.

In the same method, with respect to each side PQ, QR, RS, ST or TU of the hexagon PQRSTU, antennas belonging to each of the antenna sets B, C, D, E and F are selected, respectively. The results obtained by performing the selection actually are shown in Table 4. The antenna set A has a radiation pattern pointing to a direction of L1, the antenna set B has a radiation pattern pointing to a direction of L2, the antenna set C has a radiation pattern pointing to a direction of L3, the antenna set D has a radiation pattern pointing to a direction of L4, the antenna set E has a radiation pattern pointing to a direction of L5, and the antenna set F has a radiation pattern pointing to a direction of L6.

TABLE 4

| | Antennas belonging to antenna set: indicated by ○ | | | | | | | | | |
|---|---|---|---|---|---|---|---|---|---|---|
| | Antenna group 707 | | | Antenna group 708 | | | Antenna group 709 | | | |
| Antenna set | A* 701 (a) | A* 701 (b) | A* 701 (c) | A* 702 (a) | A* 702 (b) | A* 702 (c) | A* 703 (a) | A* 703 (b) | A* 703 (c) | Radiation Pattern |
| A | | | ○ | | ○ | | | ○ | | L1 |
| B | | ○ | | | | ○ | | ○ | | L2 |
| C | ○ | | | | | ○ | | | ○ | L3 |
| D | ○ | | | ○ | | | | | ○ | L4 |
| E | | ○ | | ○ | | | ○ | | | L5 |
| F | | ○ | | | ○ | | ○ | | | L6 |

A* denotes antenna.

| | Antennas belonging to antenna set: indicated by ○ | | | | | | | | | |
|---|---|---|---|---|---|---|---|---|---|---|
| | Antenna group 707 | | | Antenna group 708 | | | Antenna group 709 | | | |
| Antenna set | A* 704 (a) | A* 704 (b) | A* 704 (c) | A* 705 (a) | A* 705 (b) | A* 705 (c) | A* 706 (a) | A* 706 (b) | A* 706 (c) | Radiation Pattern |
| A | ○ | | | ○ | | | | | ○ | L1 |
| B | | ○ | | ○ | | | ○ | | | L2 |
| C | | ○ | | | ○ | | ○ | | | L3 |
| D | | | ○ | | ○ | | | ○ | | L4 |
| E | | | ○ | | | ○ | | ○ | | L5 |
| F | ○ | | | | | ○ | | | ○ | L6 |

A* denotes antenna.

According to the reception apparatus in this embodiment which selects antennas belonging to the antenna sets A, B, C, D, E and F with above-mentioned method, as antennas belonging to the antenna set, an antenna which is optimal to form the radiation pattern is selected from among antennas composing an antenna group for each group, facilitating the antenna selection. Further, among antennas belonging to the same antenna set, antennas for use in reception are away from each other by a distance which is about ten times the wavelength of a received signal, improving effects by the spatial diversity.

In addition, the selection of antennas belonging to the antenna set may employ a method for selecting a predetermined number, equal to or more than two, of antennas from each antenna group, and the selection is also easy with this method. Further, another method may be employed that with other conditions defined in advance, antenna groups each with a predetermined number of antennas is first selected, and a single antenna is selected only from each of the selected antenna groups. Furthermore, in this embodiment, although antennas are selected using as criterions directions each vertical to one of sides of the hexagon PQRSTU, the same effects are obtained, for example, by using as criterions diagonal lines PR, QS and others of the hexagon PQRSTU.

In addition, although this embodiment explains the case where antennas are arranged near vertexes of the hexagon, this embodiment is not limited to the hexagon and it may be possible to employ any number of vertexes such as a triangle and a pentagon.

Third Embodiment

A reception apparatus according to the third embodiment of the present invention has the same configuration as that in the first embodiment except the selection method for antenna set. Therefore, the whole configuration of the reception apparatus and operations therein are not explained, and the selection method for antenna set is only explained below.

In the same way as in the first embodiment of the present invention, antennas 101 to 108 illustrated in FIG. 3 each receives a radio signal, and desired signal power detection sections 109 to 116 measure a desired signal power level received at antennas 101 to 108, respectively. The measured results are assumed as the same as those in Table 2 explained in the first embodiment. At this point, under the condition that the antenna set includes an antenna with the largest desired signal power level, antenna set selection section 117 selects an antenna set with the largest sum of desired signal power levels among antenna sets meeting the above-mentioned condition. Specifically, as illustrated in Table 5, antenna set selection section 117 selects the antenna sets B and C to which antenna 102 with the largest desired signal power level belongs. Next, the section 117 obtains each sum of desired signal power levels received at four antennas belonging to the antenna set B or C. Finally, the section 117 selects the antenna set B with the largest sum among two antenna sets as an antenna set for use in reception.

TABLE 5

| Antenna set | Antennas belonging to antenna set | Antenna set containing antenna with highest desired signal power level | Sum of desired signal power levels | Antenna set for use in reception |
| --- | --- | --- | --- | --- |
| A | 101, 103 106, 108 | | 125 | |
| B | 102, 103 105, 108 | ○ | 95 | ○ |
| C | 102, 104 105, 107 | ○ | 80 | |
| D | 101, 104 106, 107 | | 110 | |

Accordingly, even in the case where the antenna set A would be selected if the selection was performed using the sum of desired signal power levels as the criterion with the same selection method as in the first embodiment, the above-mentioned selection method results in that the antenna set B is selected.

The reason for employing the above-mentioned selection method is that reception conditions sometimes deteriorate in the case where an antenna with the largest desired signal power level is not contained in the antenna set with the largest sum of desired signal power levels as compared to the case where the antenna set contains the antenna with the largest desired signal power level.

Thus, according to the reception apparatus in this embodiment of the present invention, since the antenna set containing the antenna with the largest desired signal power level is always selected, it is possible to achieve excellent reception conditions with high diversity effects obtained assuredly.

Fourth Embodiment

A reception apparatus according to the fourth embodiment of the present invention detects a quality of a combined signal after received signals are combined, and based on the quality, performs the selection of antenna set, which is greatly different from the reception apparatus according to the first embodiment.

Figure 10:
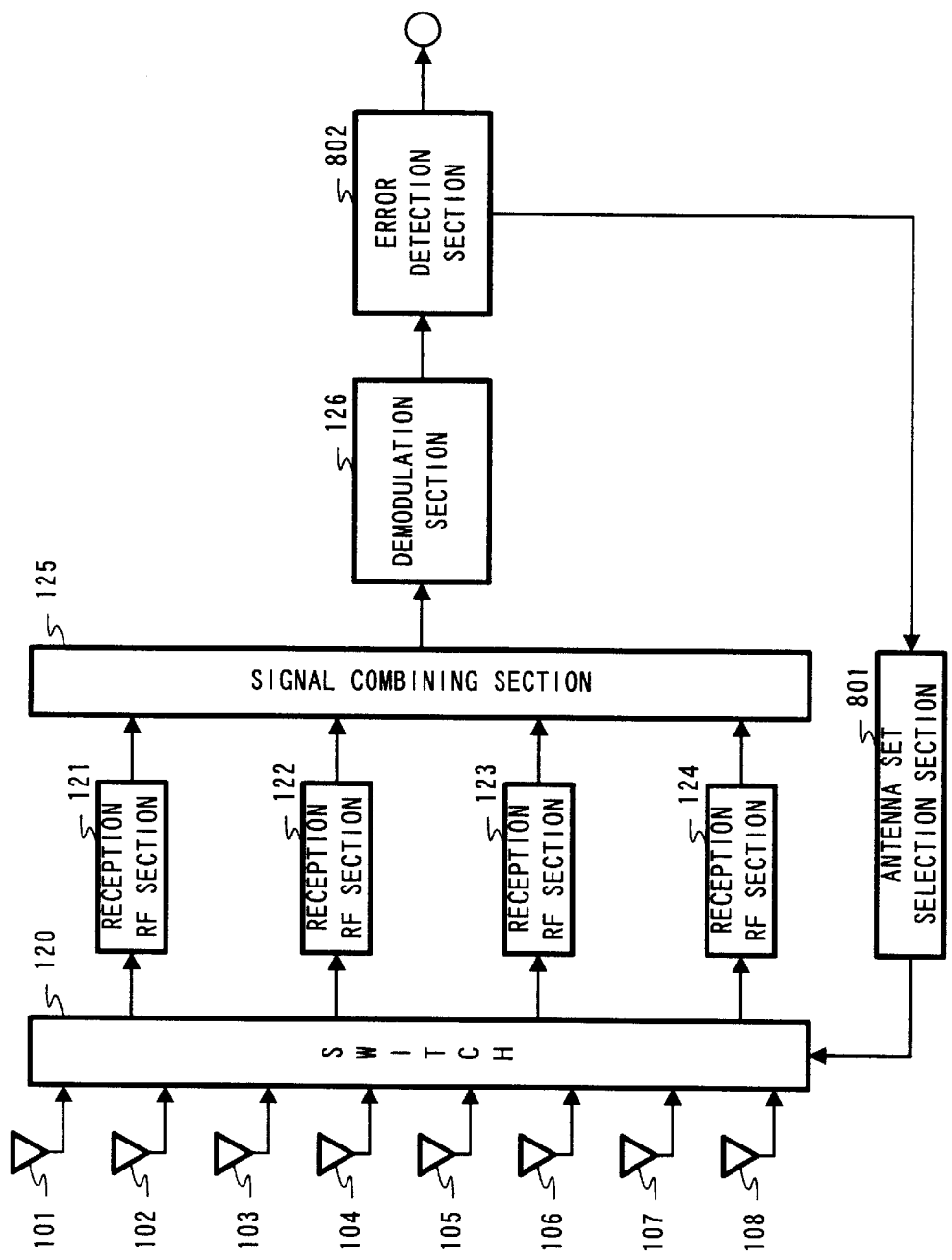
FIG. 10 is a block diagram illustrating a whole. configuration of a reception apparatus according to a fourth embodiment.

Therefore, the configuration and operations in the reception apparatus according to the fourth embodiment of the present invention are explained using FIG. 10. FIG. 10 is a block diagram illustrating the whole configuration of the reception apparatus according to the fourth embodiment of the present invention. The same components as those in the reception apparatus according to the first embodiment illustrated in FIG. 1 are given the same symbols.

The whole configuration of the reception apparatus according to the fourth embodiment of the present invention is first explained using FIG. 10. Antennas 101 to 108 each receives a radio signal. The arrangement of antennas 101 to 108 and the compositions of the antenna sets are the same as those of antennas according to the first embodiment illustrated in previously-described FIG. 5 and Table 1, and explanations thereof are omitted herein.

Switch 120 connects received signals only from antennas belonging to the antenna set selected in antenna set selection section 802 to reception RF sections 121 to 124. Reception RF sections 121 to 124 convert respective inputted received signals into the intermediate-frequency signals to output to signal combining section 125. Signal combining section 125 combines the intermediate-frequency signals from reception RF sections 121 to 124. Demodulation section 126 demodulates an output signal from signal combining section 125 to output a desired signal.

Error detection section 802 executes the error detection on the demodulated signal from demodulation section 126 using a cyclic redundant code to output a resultant. In addition, the cyclic redundant code is one of codes used in code error detection systems, and has characteristics that the coding can be executed with a simple circuit and errors can be detected efficiently. Generally, the error detection with the cyclic redundant code is executed with the system in which a transmission side divides a high-order polynomial representative of an original code by a generator polynomial defined in advance to obtain a remainder code, and transmits the resultant obtained by adding the remainder code to the original code, and a reception side divides the received code by the generator polynomial and detects errors to check whether the received code is dividable.

Antenna set selection section 801 selects an antenna set for use in reception based on the result outputted from error detection section 802, and outputs the control signal to switch 120.

Operations in the reception apparatus according to the fourth embodiment of the present invention are next explained using previously mentioned FIG. 10 and Table 1. In FIG. 10, when antennas 101 to 108 each receives a radio signal, according to the order predetermined as an initial setting, antenna set selection section 801 first selects the antenna set A shown in Table 1 as an antenna set for use in reception. Based on the selection, antenna set selection section 801 next controls switch 120 to switch between input terminals thereof to connect received signals only from antennas 101, 103, 106 and 108 belonging to the antenna set A to reception RF sections 121 to 124.

Respective received signals inputted into reception RF sections 121 to 124 are converted into the intermediate-frequency signals, combined in signal combining section 125, and demodulated in demodulation section 126 to be a desired signal. Error detection section 802 executes error detection on the demodulated signal to output the result.

In the case where an error is not detected as a result of the error detection, antenna set selection section 801 successively selects the antenna set A as the antenna set for use in reception. As a result, the reception using received signals from antennas 101, 103, 106 and 108 belonging to the antenna set A is continued.

On the other hand, in the case where an error is detected as a result of the error detection, according to the order predetermined as the initial setting, antenna set selection section 801 selects the antenna set B as the antenna set for use in reception. As a result, the reception using received signals from antennas 102, 103, 105 and 108 belonging to the antenna set B starts.

When an error is not detected in next error detection after the antenna set is switched, antenna set selection section 802 successively selects the antenna set B as the antenna set for use in reception. In the case where an error is detected again, according to the order predetermined as the initial setting, antenna set selection section 801 selects the antenna set C as the antenna set for use in reception.

Thereafter, according to the same method, the antenna set is switched until an antenna set with no error in the reception is found out.

As described above, according to the reception apparatus according to the fourth embodiment of the present invention, since antennas can be selected based on the demodulated received signal which is a final output in the reception apparatus, it is possible to attempt the optimization of a received quality the most directly and assuredly. In addition, when the received quality does not meet the predetermined criterion, the simple method is employed that the antenna set is switched to another one. Therefore, it is possible to achieve diversity effects easily with the small-sized circuit scale maintained.

In addition, although in the fourth embodiment, the switching of the antenna set is performed based on the result obtained by the error detection with the cyclic redundant code, it may be possible to perform the witching of the antenna set based on the result obtained y another detection method with the cyclic redundant ode being not used, the result of error rate, or the result obtained by detecting whether or not the constellation variance meets a predetermined reference value, and further possible to perform the switching of the antenna set based on the criterion obtained by combining the above-mentioned results.

Further, it maybe possible to perform the switching of the antenna set based on the result obtained by detecting whether or not a measured value meets a predetermined reference value, where such a measured value includes a received field strength of a combined received signal, received power level, a field strength of a received signal from a communication partner, a power level of a received signal from a communication partner, a ratio of a field strength of a received signal from a communication partner to the total received field strength, a ratio of a power level of a received signal from a communication partner to the total received power level. Furthermore, it may be possible to perform the switching of the antenna set based on the criterion obtained by combining the above-mentioned results. In such cases, it is possible to obtain the same effects as in the fourth embodiment.

As described above, according to the present invention, since the selection of antennas for use in reception is performed handling as a unit the antenna set composed of antennas selected in advance to form a predetermined radiation pattern, it is possible to achieve excellent reception conditions in a short time with the small-scaled calculation circuit using the simple selection method even in the case where the number of antennas is increased.

The present invention is not limited to the above described embodiments, and various variations and modifications may be possible without departing from the scope of the present invention.

This application is based on the Japanese Patent Application No .HEI 10-354896 filed on Dec. 14, 1998, entire content of which is expressly incorporated by reference herein.

What is claimed is:

1. A reception apparatus comprising:
   a plurality of antenna sets forming mutually different radiation patterns, each antenna set comprising a predetermined number of directional antennas selected from L directional antennas;
   a detector that detects a quality of a received signal;
   a selector that selects, in association with the quality of the received signal, an antenna set from said plurality of antenna sets for use in reception; and
   a combiner that combines signals received by said predetermined number of directional antennas of the antenna set selected by said selector,
   wherein the L directional antennas are divided into M antenna groups that each comprises N directional antennas with mutually different radiation patterns;
   wherein said M antenna groups are disposed on a virtual plane such that each antenna group is disposed on a vertex of a polygon having M vertexes; and
   wherein said predetermined number of directional antennas constituting the antenna set are selected such that one antenna is selected from each of said M antenna groups.

2. The reception apparatus according to claim 1, wherein said predetermined number of directional antennas constituting the antenna set are selected such that an antenna having a minimum angle between a direction of said L directional antennas and a direction that is perpendicular to a side of the polygon is selected from each of said M antenna groups.

3. The reception apparatus according to claim 1,
   wherein said detector detects the quality of the received signal for each of said L directional antennas; and
   wherein said selector obtains a total of the quality of the received signals of the directional antennas of every antenna set, and selects the antenna set having an optimum total of the quality of the received signals.

4. The reception apparatus according to claim 1, wherein said detector detects the quality of the received signals for each of said L directional antennas; and wherein said selector selects the antenna set that includes the directional antenna having an optimum quality of the received signals.

5. The reception apparatus according to claim 1, wherein said detector detects the quality of a combined received signal from said combiner; and wherein said selector:

selects an antenna set different than the currently selected antenna set, when the quality of the combined received signals is below a predetermined threshold; and retains the currently selected antenna set, when the quality of the combined received signals is at least equal to the predetermined threshold.

6. The reception apparatus according to claim 1, further comprising an RF section that converts a signal received by said predetermined number of directional antennas of the antenna set selected by said selector to an intermediate frequency signal, wherein said reception apparatus comprises a number of RF sections less than the number of said L directional antennas.

7. The reception apparatus according to claim 1, wherein said selector selects an antenna set for every frame that is received; and wherein said combiner combines signals received in a frame by said predetermined number of directional antennas of the antenna set selected in a preceding frame.

8. A base station apparatus comprising the reception apparatus of claim 1.

9. A reception method comprising:

selecting an antenna set for use in receiving signals from a plurality of antenna sets forming mutually different radiation patterns, where each antenna set comprises a predetermined number of directional antennas that are selected from L directional antennas; and combining signals received by said predetermined number of directional antennas of the selected antenna set, wherein said L directional antennas are divided into M antenna groups each comprising N directional antennas with mutually different radiation patterns;

wherein said M antenna groups are disposed on a virtual plane such that each antenna group is disposed on a vertex of a polygon having M vertexes; and wherein said predetermined number of directional antennas constituting the antenna set are selected such that one antenna is selected from each of said M antenna groups.

* * * * *